United States Patent
Boyd et al.

(10) Patent No.: US 9,779,466 B2
(45) Date of Patent: Oct. 3, 2017

(54) GPU OPERATION

(71) Applicant: Microsoft Technology Licensing, LLC, Redmond, WA (US)

(72) Inventors: Charles Boyd, Woodinville, WA (US); Anuj Bharat Gosalia, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 26 days.

(21) Appl. No.: 14/706,553

(22) Filed: May 7, 2015

(65) Prior Publication Data
US 2016/0328816 A1 Nov. 10, 2016

(51) Int. Cl.
G06F 15/16 (2006.01)
G06T 1/20 (2006.01)
G06F 9/44 (2006.01)
G06F 3/00 (2006.01)
G06F 3/041 (2006.01)
G06F 3/14 (2006.01)

(52) U.S. Cl.
CPC ............. *G06T 1/20* (2013.01); *G06F 3/005* (2013.01); *G06F 3/041* (2013.01); *G06F 9/4443* (2013.01); *G06F 3/14* (2013.01)

(58) Field of Classification Search
CPC ............. G06T 15/005; G06T 2200/28; G06F 3/04815; G06F 3/0488; G06F 3/01
See application file for complete search history.

(56) References Cited

U.S. PATENT DOCUMENTS

| 7,119,810 B2 | 10/2006 | Sumanaweera et al. |
| 7,944,450 B2 | 5/2011 | Bakalash et al. |
| 8,319,774 B2 | 11/2012 | Jiao et al. |
| (Continued) | | |

FOREIGN PATENT DOCUMENTS

| EP | 2706508 A1 | 3/2014 |
| WO | 2014055942 A1 | 4/2014 |

OTHER PUBLICATIONS

Ng, et al., "Designing for Low-Latency Direct-Touch Input", In Proceedings of the 25th Annual ACM Aymposium on User Interface Software and Technology, UIST '12, Oct. 7, 2012, pp. 453-464.

(Continued)

*Primary Examiner* — Hau Nguyen
(74) *Attorney, Agent, or Firm* — Schwabe, Williamson & Wyatt P.C (57) ABSTRACT

One or more techniques and/or systems are provided for operating a graphics processing unit (GPU). A sensor of a computing device may collect sensor input data (e.g., camera input, touch input, video input, etc.), which may be provided to the GPU. An input process within the GPU may be invoked to process the sensor input data to generate a result that may be retained within GPU accessible memory (e.g., a touch sensor process may generate a gesture result based upon touch input from a touch panel of the computing device). An output process within the GPU may be invoked to utilize the result within the GPU accessible memory, for display rendering. In this way, latency between user input and display rendering may be mitigated by streamlining processing on the GPU by mitigating transmission of data between the GPU and a CPU of the computing device for display rendering.

16 Claims, 10 Drawing Sheets (56) References Cited

U.S. PATENT DOCUMENTS

| | | |
|---|---|---|
| 2007/0091088 A1 | 4/2007 | Jiao |
| 2009/0217252 A1 | 8/2009 | Aronson et al. |
| 2010/0123717 A1 | 5/2010 | Jiao |
| 2011/0242125 A1 | 10/2011 | Hall et al. |
| 2012/0026178 A1* | 2/2012 | Kasperkiewicz ......... G06T 1/20 345/522 |
| 2013/0063459 A1 | 3/2013 | Schneider et al. |
| 2013/0169642 A1 | 7/2013 | Frascati et al. |
| 2014/0143692 A1* | 5/2014 | Wigdor ................ G06F 3/0488 715/764 |
| 2014/0325530 A1* | 10/2014 | Lu .......................... G06F 9/542 719/318 |

OTHER PUBLICATIONS

"International Search Report and Written Opinion Issued in PCT Application No. PCT/US2016/029274", dated Aug. 17, 2016, 12 Pages.

"Second Written Opinion Issued in PCT Application No. PCT/US2016/029274", dated May 3, 2017, 7 Pages.

Kodiyalam, Srinivas, "Gpu Computing with MSC Nastran 2013", <<http://pages.mscsoftware.com/rs/mscsoftware/images/Paper_GPU%20Computing%20with%20MSC%20Nastran%202013.pdf>>, Retrieved on Apr. 13, 2017, 13 Pages.

* cited by examiner

GPU OPERATION

BACKGROUND

Many computing devices comprise a central processing unit (CPU) and a graphics processing unit (GPU). The CPU may be configured to execute applications hosted on a computing device, such as by processing instructions of a thread for an application. The GPU may be configured to perform various tasks associated with graphics display rendering, such as rendering a user interface for display on a monitor. Because the GPU may process a substantial amount of data in a short amount of time (e.g., rendering 2 million pixels for display 60 times a second), the GPU may be configured for parallel data processing whereas the CPU may not comprise such capabilities (e.g., the CPU may be tuned for processing application code, keyboard and mouse input, internet data packets, and/or other data that may not necessitate parallel data processing). In this way, the CPU and the GPU may work together to process information, such as sensor input data (e.g., camera imagery, video input, touch input, etc.). For example, the GPU may receive sensor input data that is then provided to the CPU for processing by a code module executing on the CPU, such as an application and/or an OS code module (e.g., touch input may be processed to identify a finger gesture result, such as a scroll gesture for a user interface). The code module may send a result of the processing to the GPU for utilization in display rendering (e.g., the GPU may render the user interface based upon the finger gesture result). Because the sensor input data and/or the result is transferred between the GPU and the CPU one or more times, a user may experience latency between the touch input and viewing the rendered user interface, which may diminish the user's experience.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for operating a graphics processing unit (GPU) and/or for content rendering are provided herein. In an example of operating a GPU, an input process within the GPU is invoked to process sensor input data to generate a result retained within GPU accessible memory. The sensor input data is received from a sensor by the GPU. An output process within the GPU is invoked to utilize the result for display rendering. In an example of content rendering, a command list comprising a rendering command is generated. An input state reference, to an input state canonical location, is included in the rendering command. The command list is inserted into a queue. Responsive to the command list traversing the queue to an end position, the command list is retrieved from the queue. The input state canonical location may be updated with updated input state data. The updated input state data is retrieved from the input state canonical location using the input state reference. The rendering command is executed based upon the updated input state data to render content.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

Among other things, one or more systems and/or techniques for operating a graphics processing unit (GPU) are provided herein. A computing device may comprise a central processing unit (CPU) and the GPU. In an example, a sensor (e.g., a camera, a video capture device, a motion sensing device, a touch panel, a video stream, a photo stream, an audio stream, etc.) may be configured to provide sensor input data to the GPU. As opposed to sending the sensor input data to the CPU (e.g., for processing by an app that utilizes the sensor input data), the GPU retains the sensor input data for processing by an input process within the GPU to generate a result. The result may be retained within GPU accessible memory for access by an output process within the GPU, as opposed to transferring the result to the CPU for further processing, which may introduce latency because the output process would have to wait for the CPU to send the result back to the GPU before the output process could use the result. The output process utilizes the result, retained within GPU accessible memory by the input process, for display rendering. In this way, the output process utilizes the result that was retained on the GPU, such as being stored within a canonical location by the input process, as opposed to receiving the result from the CPU. Thus, the sensor input data may be efficiently processed by the GPU "in place", which may mitigate latency and/or bandwidth utilization that may otherwise occur where the sensor input data is sent to the CPU for processing of the result and/or from sending the result from the CPU to the GPU for the display rendering.

In an example, the sensor comprises a motion sensing device that utilizes a camera, an infrared camera, a depth camera, and/or a microphone to capture sensor input data. The motion sensing device provides the sensor input data to the GPU for processing by the input process, such as a motion sensing analysis code module. The motion sensing analysis code module may process the sensor input data to determine a result, such as a gesture result (e.g., a user may have gestured to the motion sensing device by waving a right arm from right to left, which may correspond to a back navigation gesture). The motion sensing analysis code module may store the gesture result within the GPU, such as within a canonical location, for access by an output process. The output process, such as a graphics rendering GPU code module, may utilize the gesture result stored within the GPU for display rendering (e.g., rendering a previous screen corresponding to the back navigation gesture). In this way, processing of the sensor input data is streamlined on the GPU to mitigate latency and/or bandwidth utilization that may otherwise result from transmitting the sensor input data and/or the result between the CPU and the GPU.

Figure 1:
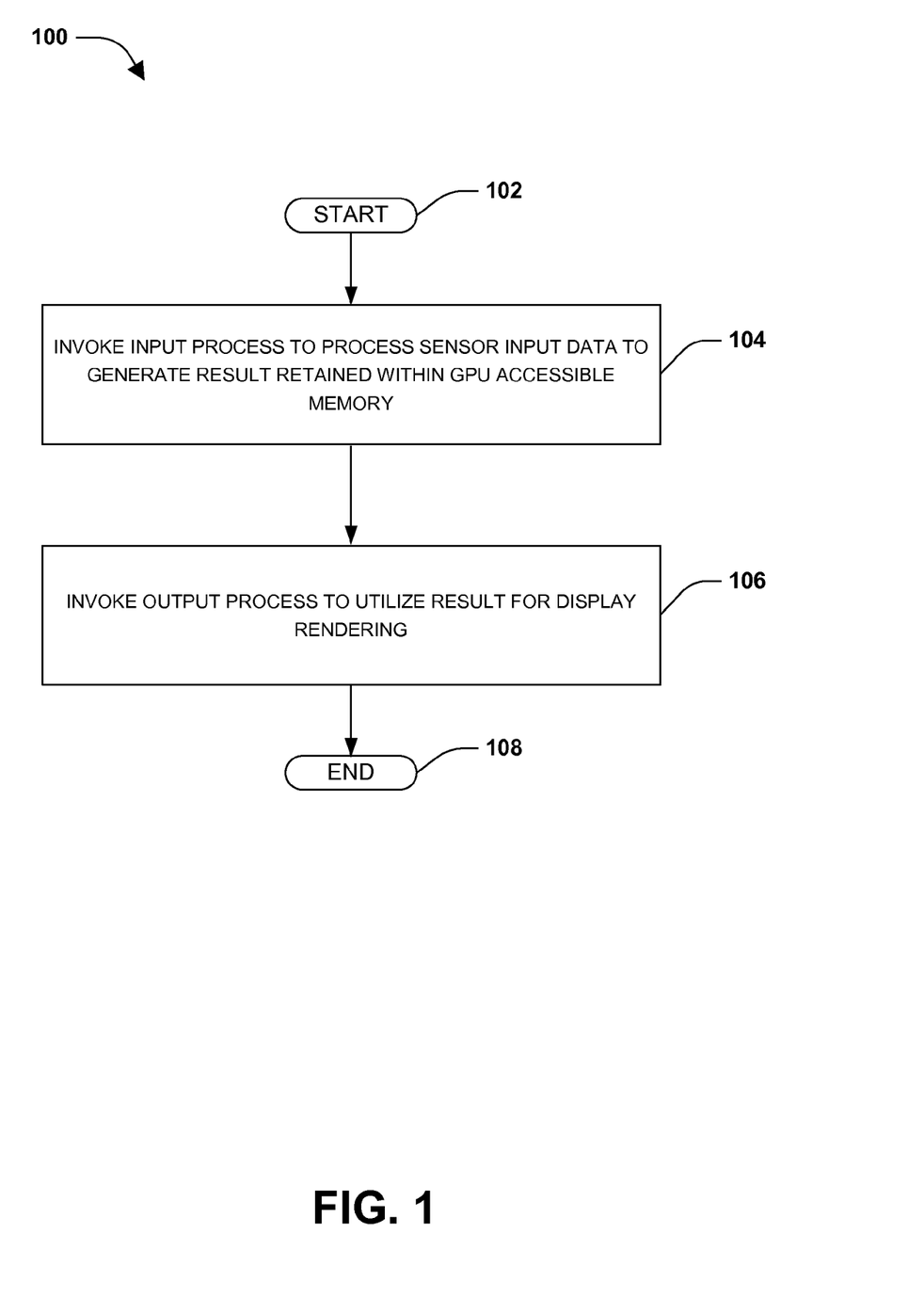
FIG. 1 is a flow diagram illustrating an exemplary method of invoking a graphics processing unit (GPU).

An embodiment of invoking a graphics processing unit (GPU) is illustrated by an exemplary method 100 of FIG. 1. At 102, the method starts. A computing device may be associated with a sensor configured to collect sensor input data (e.g., visual pixel data captured by a motion sensing camera, a video stream, touch data captured by a touch panel of a tablet device and/or a wide variety of data such as infrared input, audio input, stylus input, depth input, touch input, camera input, video input, etc.). The sensor may be configured to provide the sensor input data to the GPU of the computing device.

At 104, an input process, within the GPU, may be invoked to process the sensor input data to generate a result that may be retained within GPU accessible memory (e.g., "left in place"). In an example, an operating system scheduler may schedule the input process for execution on the GPU, and thus the operating system scheduler may invoke the input process based upon a schedule for the input process (e.g., the input process may be scheduled to execute about 60 times per second and/or whenever sensor input data is received). In an example, the input process may be provided with read/write access for the sensor input data. In an example of invoking the input process, the GPU may be invoked to perform parallel data processing on the sensor input data, which may be more efficient than how a central processing unit (CPU) of the computing device may otherwise process the sensor input data. The input process may be instructed to store the result within a canonical memory location (e.g., within the GPU) accessible to an output process within the GPU. In an example, the sensor input data may comprise touch input, and the input process may comprise a touch-sensor processing GPU code module configured to process the touch input to identify a gesture as the result.

At 106, the output process, within the GPU, may be invoked to utilize the result for display rendering. For example, the output process may utilize the result stored within the GPU, such as within the canonical memory location, by the input process. In this way, the input process and the output process may be streamlined to access and/or process the sensor input data and the result without accessing the CPU, which may otherwise introduce latency due to transmitting the sensor input data and/or the result between the CPU and the GPU. For example, the result is not provided by the CPU to the GPU for utilization by the output process, but is instead retained within the GPU accessible memory by the input process for access by the output process. In an example, the operating system scheduler may schedule the output process for execution on the GPU, and thus the operating system scheduler may invoke the output process based upon a schedule for the output process (e.g., the output process may be scheduled to execute about 60 times per second or based upon a refresh rate of the computing device). In an example, the input process may be provided with at least read access for the sensor input data and/or the result. In an example, the result may comprise a gesture identified by the input process, and the output process may comprise a graphics rendering GPU code module configured to render a user interface based upon the gesture result. In this way, the input process may process the sensor input data to generate a result that may be stored on the GPU for utilization by the output process, and thus the input process and the output process may mitigate latency that may otherwise be introduced where such data may be transmitted between the CPU and the GPU.

In an example, the sensor input data may be sent to the CPU after the output process has been invoked for display rendering. In another example, the result may be sent to the CPU after the output process has been invoked for display rendering. Because a user's experience with the computing device may be affected by the display rendering (e.g., latency or lag between a user interacting with a tablet device and display of an updated user interface based upon such interaction), access to the sensor input data and/or the result may be prioritized for the output process over the CPU, such as being prioritized over an operating system module or a third party app executed by the CPU. In another example, the sensor input data and/or the result is provided to the CPU at any time (e.g., before completion of the display rendering), however, the output process may utilize the result while the result is stored on the GPU, as opposed to the result being transferred to the CPU and then being provided back to the GPU by the CPU, which may otherwise introduce latency. In another example, the result comprises a sensor result from the input process. The sensor result may be used as an input to the output process before the sensor result is sent to the CPU. In an example where the result is stored within a canonical memory location within the GPU, the canonical memory location may be provided to a third party app and/or an operating system module executed by the CPU. In another example, an asynchronous update may be facilitated for an app based upon the result (e.g., an app, corresponding to a currently displayed user interface rendered based upon the result, may be provided with access to the sensor input data and/or the result asynchronously, such as after completion of the display rendering). It may be appreciated that 104-106 may be performed in any order (e.g., sequentially, synchronously, asynchronously, etc.). At 108, the method ends.

Figure 2:
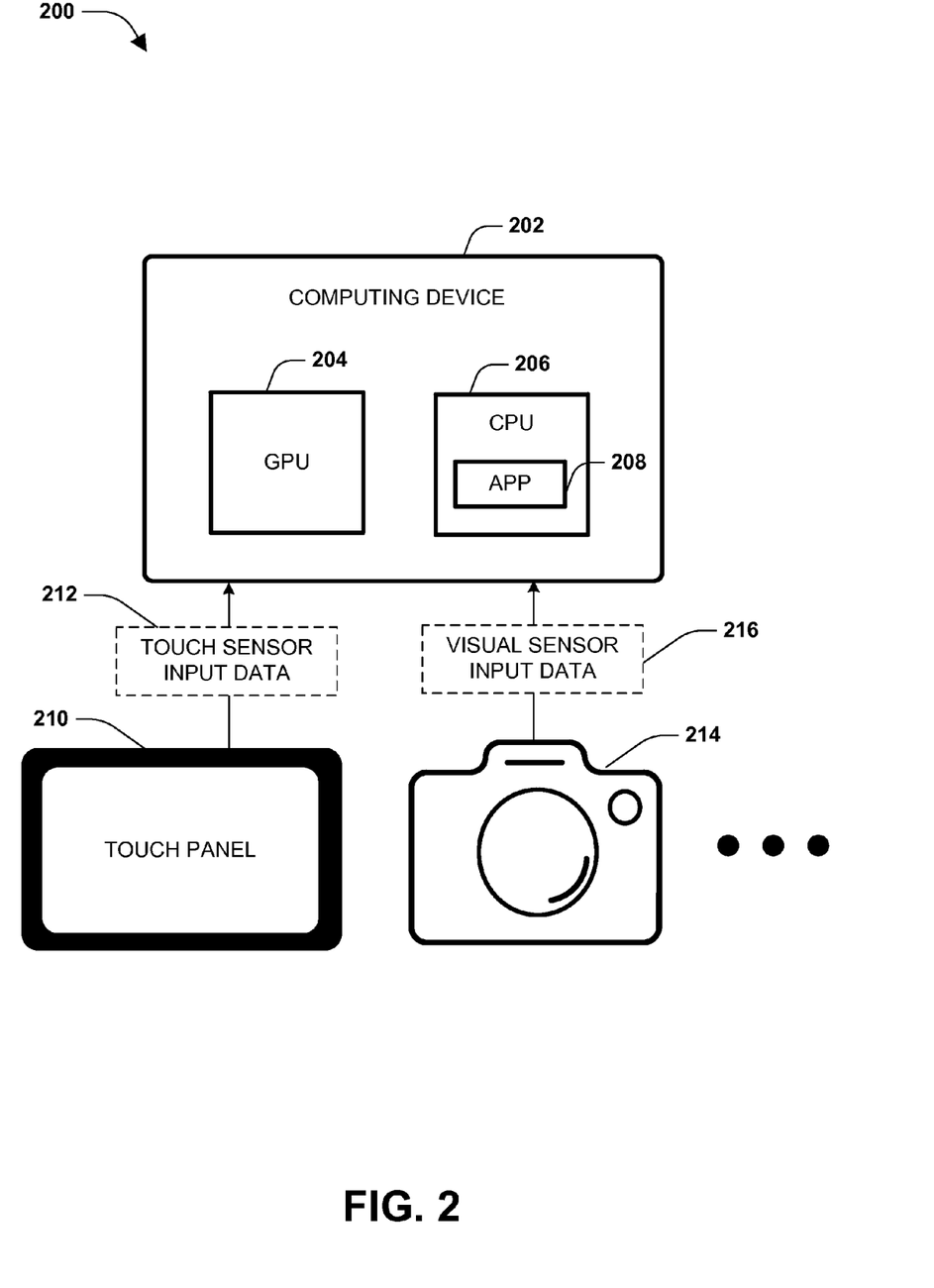
FIG. 2 is an illustration of an example computing device receiving sensor input data.

FIG. 2 illustrates a computing device 202 receiving sensor input data. For example, the computing device 202 may comprise a CPU 206 that may be executing an application 208, such as a video editing application. The computing device 202 may comprise a GPU 204 configured to render graphics, such as a video editing user interface of the video editing application, on a display of the computing device 202. The computing device 202 may receive touch sensor input data 212 from a touch panel 210 associated with the computing device 202 (e.g., the user may interact with the video editing user interface using the touch panel 210). The computing device 202 may receive visual sensor input data 216 from a camera device 214 (e.g., captured video frames that are provided to the application 208). As provided herein, the GPU 204 is utilized for processing the sensor input data, such as the touch sensor input data 212, the visual sensor input data 216 and/or other sensor input data.

Figure 3:
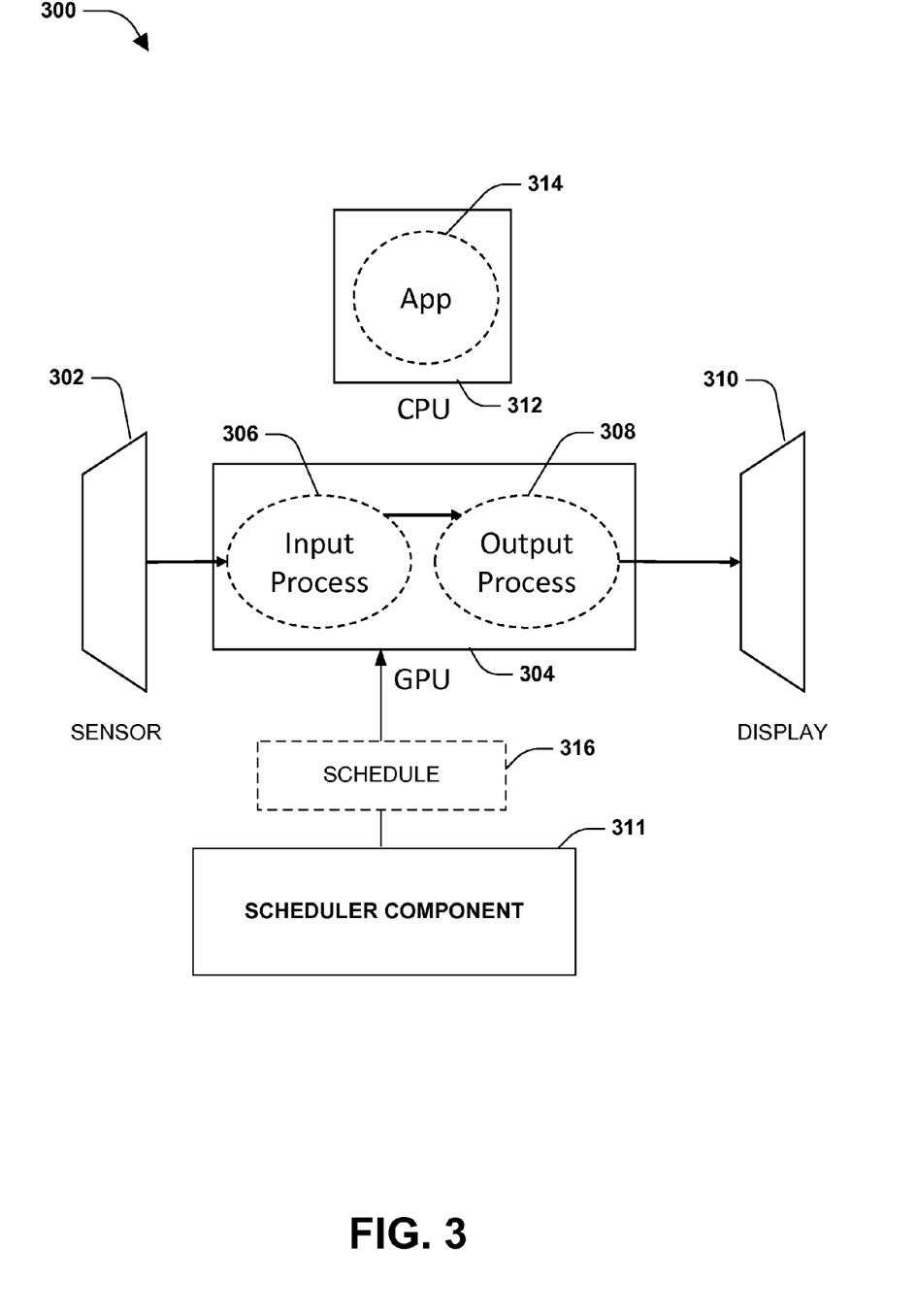
FIG. 3 is a component block diagram illustrating an exemplary system for invoking a graphics processing unit (GPU).

FIG. 3 illustrates an example of a system 300 for invoking a GPU 304. The system 300 may be configured to facilitate streamlined GPU processing of sensor input data and/or a result of such processing, which may mitigate latency and/or lag otherwise introduced by non-streamline processing involving a CPU 312. The system 300 comprises a scheduler component 311 (e.g., an operating system scheduler). The scheduler component 311 may be associated with a computing device comprising the GPU 304 and the CPU 312. The CPU 312 may be configured to execute operating system code modules and/or application code modules, such as a thread for an app 314 associated with a currently displayed user interface. The computing device may comprise a sensor 302 configured to collect sensor input data. The scheduler component 311 may be configured to invoke an input process 306 within the GPU 304 to process the sensor input data to generate a result that may be retained within GPU accessible memory associated with the GPU 304. The scheduler component 311 may be configured to invoke an output process 308 within the GPU 304 to utilize the result for display rendering to a display 310 of the computing device. In this way, the scheduler component 311 may be configured to schedule 316 the input process 306 and the output process 308 within the GPU 304 for streamlined processing of the sensor input data and/or the result, which may mitigate latency otherwise introduced by transmission of data between the GPU 304 and the CPU 312 (e.g., the output process 308 may not utilize result data from the CPU 312 and/or from the app 314, but may instead utilize the result retained on the GPU 304 by the input process 306).

Figure 4:
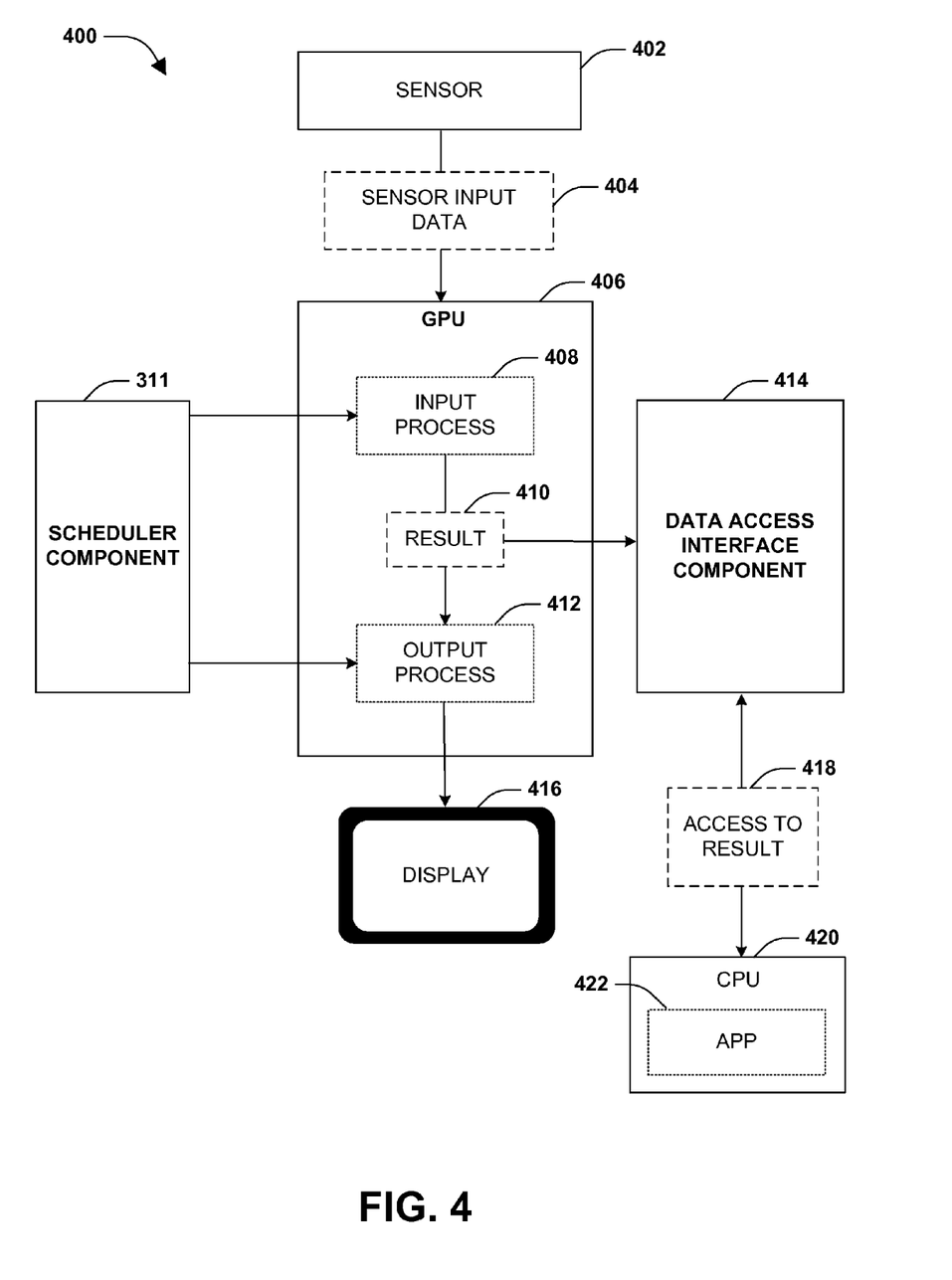
FIG. 4 is a component block diagram illustrating an exemplary system for invoking a graphics processing unit (GPU).

FIG. 4 illustrates an example of a system 400 for invoking a GPU 406. The system 400 may be associated with a computing device comprising a sensor 402, a GPU 406, a CPU 420, and a display 416. The sensor 402 may be configured to collect sensor input data 404, and provide the sensor input data 404 to the GPU 406. The system 400 may comprise a scheduler component 311 that may be configured to invoke an input process 408 within the GPU 406 to process the sensor input data 404 to generate a result 410 that may be retained within GPU accessible memory associated with the GPU 406. For example, the result 410 may be retained within the GPU accessible memory for access (e.g., "in place" access) by an output process 412 within the GPU 406. The scheduler component 311 may invoke the output process 412 to utilize the result 410, retained within the GPU accessible memory by the input process 408, for display rendering on the display 416.

The system 400 may comprise a data access interface component 414 configured to provide the CPU 420, such as an app 422 executing within the CPU 420, with access 418 to the result 410. In an example, the data access interface component 414 may provide the result 410 to the CPU 420 after the input process 408 generates the result 410. In another example, the data access interface component 414 may provide the result 410 to the CPU once the output process 412 has gained access to the result 410 on the GPU 406, such as during the display rendering. In another example, the data access interface component 414 may provide the result 410 to the CPU after the output process 412 has been invoked for display rendering (e.g., FIG. 5). In another example, the data access interface component 414 may facilitate an asynchronous update for the app 422 (e.g., FIG. 6). In another example, the data access interface component 414 may provide the CPU 420 with access to the result 410 at any time.

Figure 5:
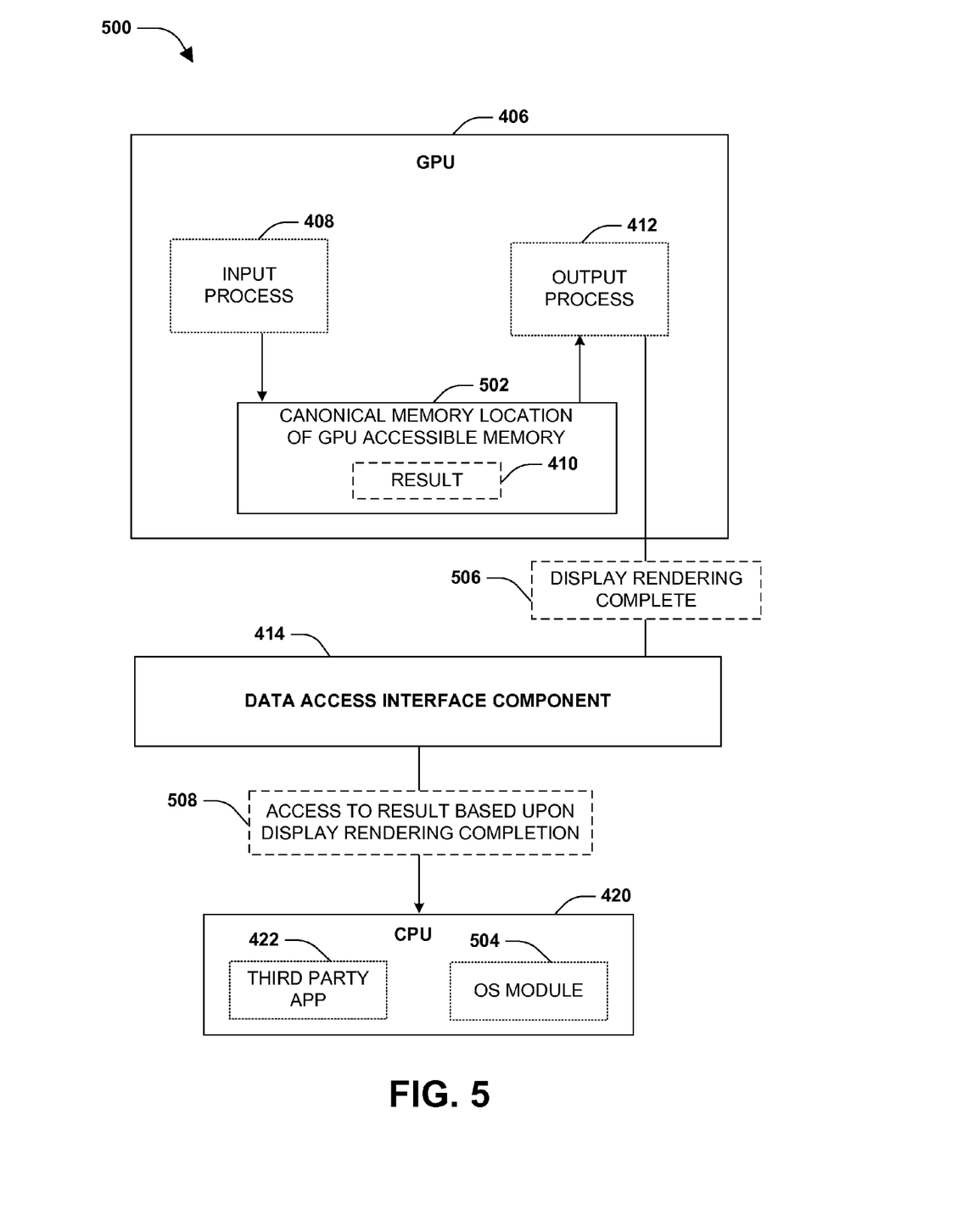
FIG. 5 is a component block diagram illustrating an exemplary system for providing a central processing unit (CPU) with access to a result after display rendering completion by a graphics processing unit (GPU).

FIG. 5 illustrates an example of a system 500 for providing a CPU 420 with access 508 to a result 410. The system 500 comprises a data access interface component 414. The data access interface component 414 may be associated with a GPU 406. The GPU 406 may execute an input process 408 configured to process sensor input data to generate a result 410. The input process 408 may retain the result 410 within the GPU 406, such as by storing the result 410 within a canonical memory location 502. The GPU 406 may execute an output process 412 configured to utilize the result 410, retained within GPU accessible memory associated with the GPU 406 by the input process 408, for display rendering. For example, the output process 412 may access the result 410 within the canonical memory location 502. The data access interface component 414 may determine 506 that the display rendering has been invoked. Responsive to the display rendering being invoked, the data access interface component 414 may provide the CPU 420, such as a third party app 422 and/or an operating system module 504 executing within the CPU 420, with access 408 to the result 410.

Figure 6:
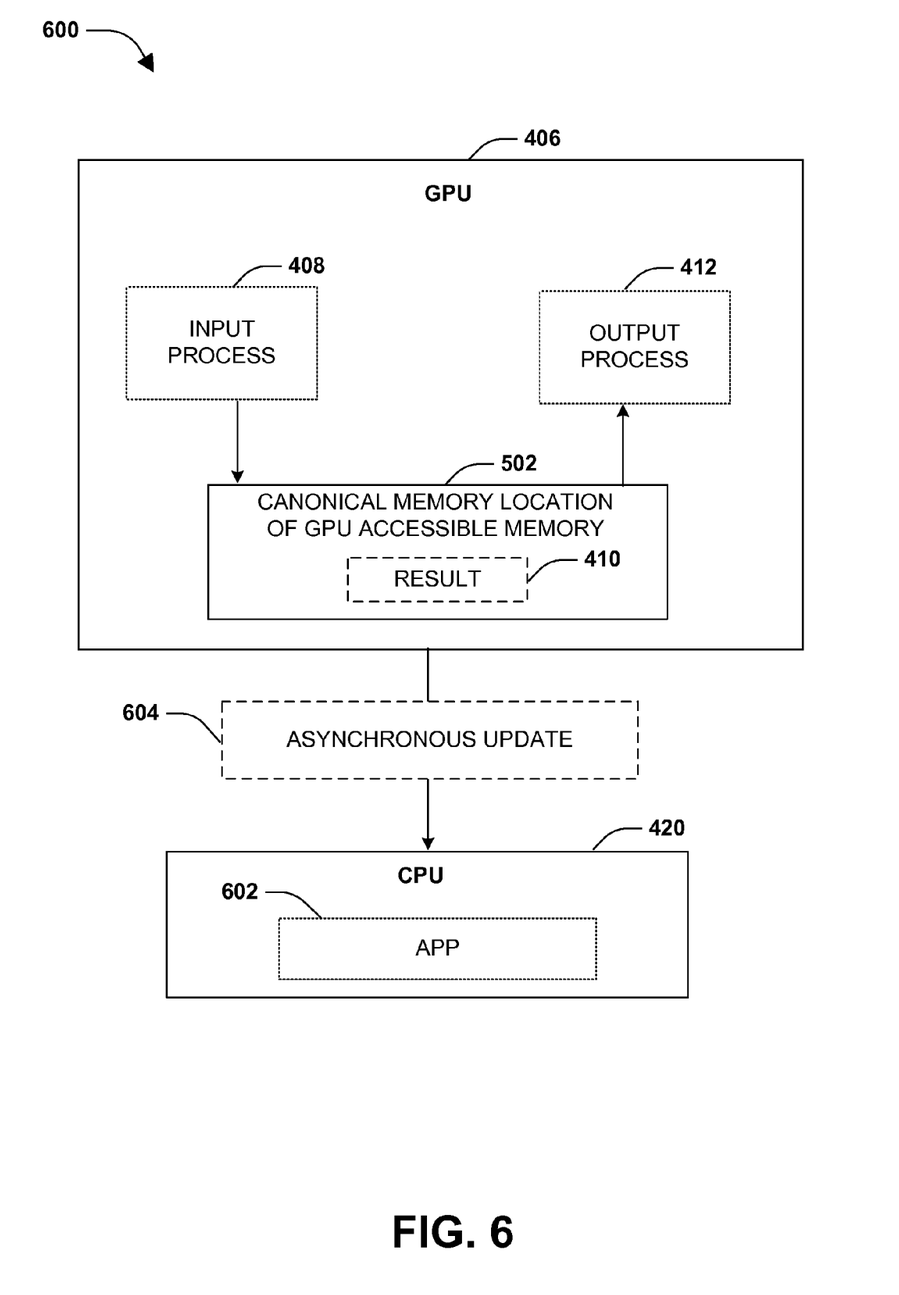
FIG. 6 is an illustration of an example of asynchronously updating an app.

FIG. 6 is an illustration of an example 600 of asynchronously updating an app 602. A computing device may comprise a GPU 406 and a CPU 420. The GPU 406 may execute an input process 408 configured to process sensor input data to generate a result 410. The input process 408 may retain the result 410 within the GPU 406, such as by storing the result 410 within a canonical memory location 502. The GPU 406 may execute an output process 412 configured to utilize the result, retained within GPU accessible memory associated with the GPU 406 by the input process 408, for display rendering. For example, the output process 412 may access the result 410 within the canonical memory location 502. In an example, the CPU 420 may execute an app 602, such as an app associated with a currently displayed user interface that was resized by the output process 412 based upon the result 410 (e.g., the result 410 may have corresponded to a touch input for resizing the user interface of the app 602). The app 602 may be asynchronously updated 604 with the result 410, such that the app 602 may become aware of a gesture input result identified from the touch input. In an example, the asynchronous update may be performed after the output process 412 performs the display rendering.

One or more systems and/or techniques for content rendering are also provided. Many applications and/or computing devices utilize image input, such as touch sensor panels, gesture recognition cameras, head trackers, etc. Such information may need to be processed by a relatively powerful processor, such as a graphics processing unit (GPU), to distill the image input into a compact form that may be manageable by application code. Conventional image processing techniques may sample input data of an input sensor (e.g., an image of an eye captured by a gaze tracking input sensor camera) before submitting a rendering command to an operating system application programming interface (API) for interfacing with an operating system. The operating system may queue up multiple rendering commands (e.g., multiple frames of work) in order to smooth glitches and even out workload. Unfortunately, the sampled input data may become stale by the time the rendering command is executed for rendering the sampled input data. As provided herein, an input state reference, to an input state canonical location (e.g., a location with the GPU that will be executing the rendering command), may be included within the rendering command so that the input state reference may be utilized during execution of the rendering command to obtain up-to-date input state data (e.g., up-to-date pixel data, of the eye, captured by the gaze tracking input sensor camera) for rendering of content (e.g., the user may navigate between photos of a photo application based upon gaze tracking of the user's eye). Thus, in an example, the input state data may not be sampled, evaluated, and/or included within the rendering command (e.g., during creation and/or queueing of the rendering command) until execution of the rendering command. In this way, the photo application may depict a scene of photos based upon the latest input state data, which may reduce latency because rendering commands are created and queued with embedded information (e.g., the input state reference) that is later replaced with up-to-date input state data (e.g., updated input state data from the gaze tracking input sensor camera). G-sync, variable fps, and/or glitch resilience may be implemented while mitigating missing frames of content because the latest input state data may be used.

Figure 7:
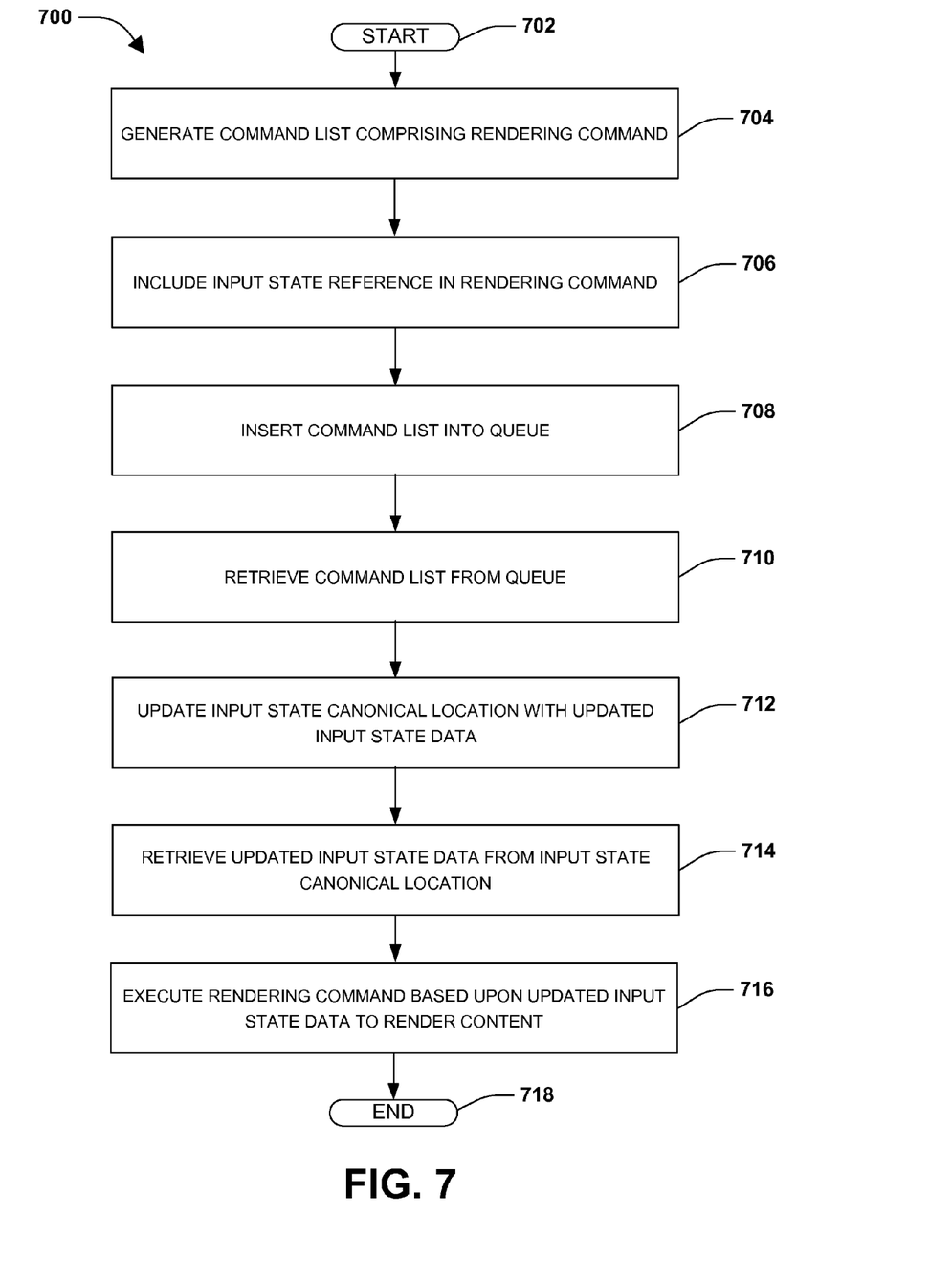
FIG. 7 is a flow diagram illustrating an exemplary method of content rendering.

An embodiment of content rendering is illustrated by an exemplary method 700 of FIG. 7. At 702, the method starts. A computing device (e.g., a tablet, a videogame console, a peripheral such as a videogame motion sensor, a smart phone, a laptop, a personal computer, a smart watch, smart glasses, etc.) may host an application that displays information, such as through an application user interface, based upon input state data of an input sensor (e.g., a photo application may allow a user to navigate between photos using motion gestures that are detected by a camera input sensor). At 704, a command list may be generated. The command list may comprise one or more rendering commands that are to be executed for rendering content (e.g., rendering of a photo application user interface) based upon input state data of the input sensor (e.g., a 3D touch finger position, a 3D hand position, a 3D finger position, 3D camera position and orientation data, gaze tracking points, object tracking position and orientation data, limb tracking position and orientation data, current system timer data, a controller device button state, a joystick state, or any other data from an input sensor). For example, a rendering process may pack rendering commands into the command list.

At 706, an input state reference, to an input state canonical location, may be included within the rendering command. The input state canonical location may correspond to a graphics processing unit (GPU) buffer, a GPU system variable, a standardized canonical format of a graphics platform, etc. In an example, input state data is not sampled, evaluated, and/or included within the rendering command at the time the rendering command is created, but instead the input state reference is included in the rendering command so that the input state reference may be later utilized, such as during execution of the rendering command, to obtain up-to-date input state data for content rendering (e.g., as opposed to rendering the photo application user interface using stale pixel gesture data from the camera input sensor). The command list may be executed at some point in time to generate content, such as a frame of graphics for the photo application user interface. In an example, rendering commands may be assigned input state references to separate copies of the input state canonical location so that multiple frames, of the photo application user interface, may be simultaneously rendered for later use. At 708, the command list may be inserted into a queue. In this way, one or more command lists, used to generate content, may be stored within the queue for execution using up-to-date input state data from the camera input sensor.

Responsive to the command list traversing the queue to an end position (e.g., a position within the queue indicating that the command list is ready for execution), the command list may be retrieved from the queue, at 710. At 712, the input state canonical location may be updated with updated input state data. In an example, the updated input state data may correspond to up-to-date gesture pixel data from the camera input sensor. In an example, the updated input state data may be derived from a projected and/or predicted value of a state of the camera input sensor at a particular point in time. In an example, the updated input state data is retrieved from the camera input sensor when the rendering command is ready for execution (e.g., when the rendering command is at the end of a GPU pipe such, as when shader constants are located for a shader that references the updated input state data as predefined registers for shading, which may mitigate latency), and the updated input state data is stored within the input state canonical location for retrieval by the rendering command during execution. At 714, the input state reference may be used to retrieve updated input state data from the input state canonical location. At 716, the rendering command is executed based upon the updated input state data to render the content (e.g., render a frame of the photo application user interface based upon up-to-date gesture pixel data from the camera input sensor).

In an example, a post-processing correction command may be included within the command list. The input state reference may be included in the post-processing correction command. Responsive to the execution of the rendering command, the input state canonical location may be updated with second updated input state data (e.g., new up-to-date gesture pixel data may be retrieved from the camera input sensor). The second updated input state data may be retrieved from the input state canonical location using the input state reference. The post-processing correction command may be executed based upon the second updated input state data (e.g., to determine a delta correction for the rendered frame based upon the new up-to-date gesture pixel data). In an example, post-processing corrections may be applied by an operating system to the output of an application to improve the appearance of the application (e.g., where latency is a factor, such as in a touch scenario). It may be appreciated that 704-716 may be performed in any order (e.g., sequentially, synchronously, asynchronously, etc.). At 718, the method ends.

Figure 8:
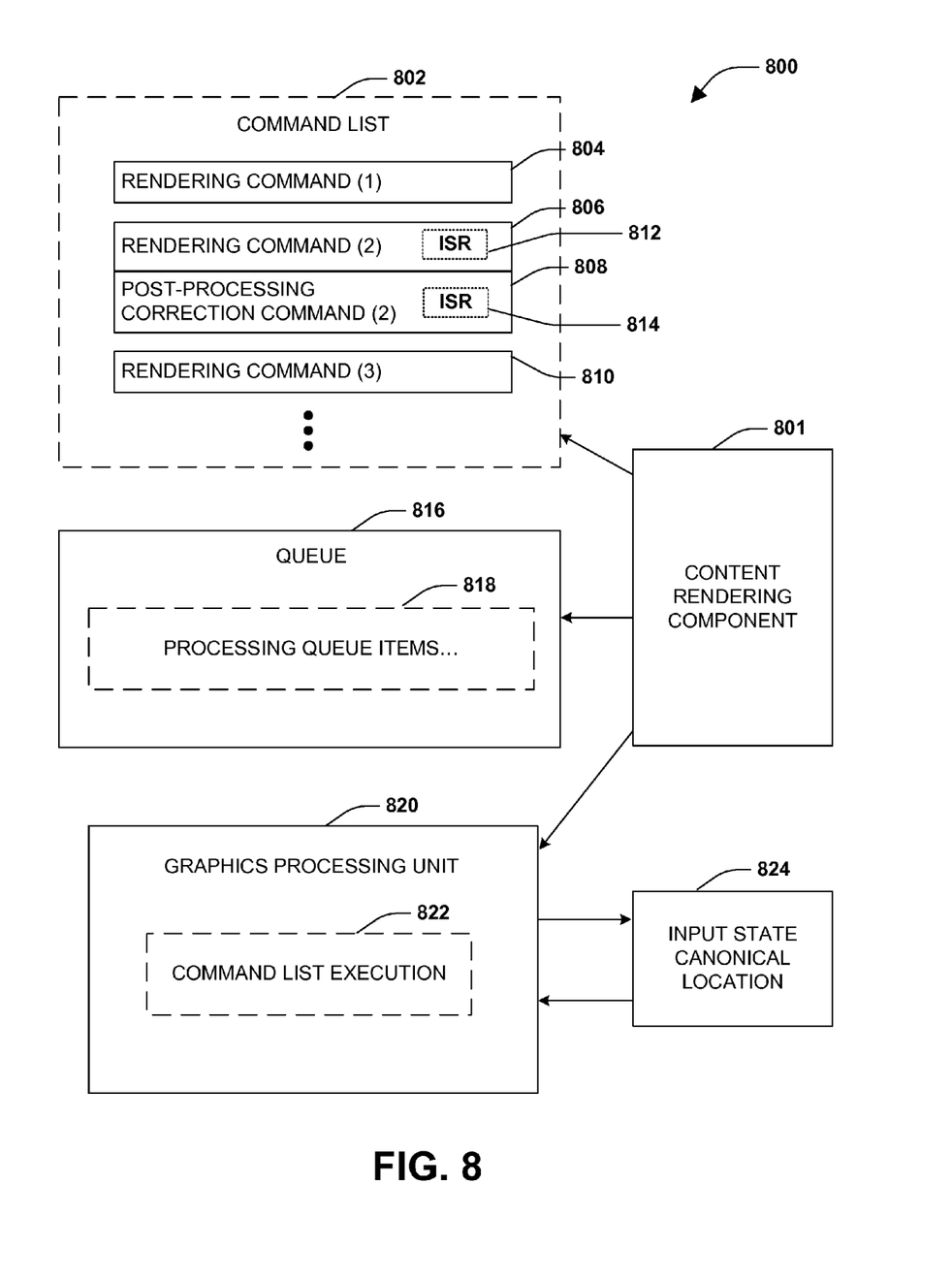
FIG. 8 is a component block diagram illustrating an exemplary system for content rendering.

FIG. 8 illustrates an example of a system 800 for content rendering. The system 800 may comprise a content rendering component 801. The content rendering component 801 may be associated with a computing device that may utilize input state data from an input sensor. For example, the computing device may host a puzzle videogame that may be controlled by touch gestures detected by a touch display. The puzzle videogame may comprise a function that draws a complicated icon on a puzzle videogame interface at a position corresponding to a user finger touch location, which may visually aid the user in playing the puzzle videogame. The content rendering component 801 may be configured to generate and manage the execution of rendering commands used to render and display content for the puzzle videogame, such as the complicated icon within the puzzle videogame interface.

The content rendering component 801 may generate a command list 802, comprising one or more rendering commands, for displaying the puzzle game interface. For example, the command list 802 may comprise a first rendering command 804 (e.g., an update touch points command that notifies the touch display to put the latest touch points values into an input state canonical location 824), a second rendering command 806 (e.g., a set position command used to determine the position at which to draw the complicated icon) with a second post-processing correction command 808 (e.g., used to update the position of the complicated icon, such as where there is a delay in drawing the complicated icon), a third rendering command 810 (e.g., use to draw the complex icon at the position), etc. The content rendering component 801 may include a first input state reference 812, to the input state canonical location 824, in the second rendering command 806. The content rendering component 801 may include a second input state reference 814, to the input state canonical location 824, in the second post-processing correction command 808. The input state canonical location 824 may correspond to a location within a graphics processing unit (GPU) 820 (e.g., a memory location, such as a buffer, of the GPU 820) into which the touch display may storage input state data, such as touch points detected by the touch display. In this way, the second rendering command 806 may utilize the first input state reference 812, and the second post-processing correction command 808 may utilize the second input state reference 814 to obtain up-to-date touch points from the input state canonical location 824 based upon touch point data being placed into the input state canonical location 824 by the touch display when the second rendering command 806 and the second post-processing correction command 808 are being executed (e.g., as opposed to touch point data obtained when the second rendering command 806 and the second post-processing correction command 808 are being defined within the command list 802, which may become stale by execution time).

The content rendering component 801 may insert the command list 802 into a queue 816. The command list 802 and/or other command lists, not illustrated, may be processed 818 through the queue 816 until ready for execution by the GPU 820. For example, the command list 802 may traverse the queue 816 until reaching an end position indicating that the command list 802 is ready for execution 822 by the GPU 820. The content rendering component 801 may retrieve the command list 802 from the queue 816 so that the command list 802 may be executed 822 by the GPU 820. The first rendering command 804 may be executed by the GPU 820 to notify the touch display to put updated input state data into the input state canonical location 824. The first input state reference 812, of the second rendering command 806, may be used to retrieve the updated input state data from the input state canonical location 824, and the second rendering command 806 may be executed based upon the updated input state data to render content, such as the complex icon at a position corresponding to touch points defined within the updated input state data. In an example, late delta correction for the position of the complex icon may be implemented by the second post-processing correction command 808. For example, the touch points within the updated input state data may be cached as cached touch points. New updated touch points, if available, may be requested from the touch display for storage in the input state canonical location 824 as second updated input state data. The post-processing correction command 808 may use the second input state reference 814 to retrieve the new updated touch points from the input state canonical location 824. A delta between the cached touch points and the new updated touch points may be determined, and the complex icon may be moved based upon the delta to a new position. The third rendering command 810 may be executed to draw the complex icon at the position or the new position if applicable. In this way, up-to-date input state data may be utilized during execution of the command list 802.

According to an aspect of the instant disclosure, a method for operating a graphics processing unit (GPU) is provided. The method includes a invoking an input process within a GPU to process sensor input data to generate a result retained within GPU accessible memory. The sensor input data is received from a sensor by the GPU. The method includes invoking an output process within the GPU to utilize the result for display rendering.

According to an aspect of the instant disclosure, a system for operating a graphics processing unit (GPU) is provided. The system includes a scheduler component. The scheduler component is configured to invoke an input process within a GPU to process sensor input data to generate a result retained within GPU accessible memory. The sensor input data is received from a sensor by the GPU. The scheduler component is configured to invoke an output process within the GPU to utilize the result for display rendering.

According to an aspect of the instant disclosure, a computer readable medium comprising instructions which when executed performs a method for content rendering is provided. The method includes generating a command list comprising a rendering command. The method includes including an input state reference, to an input state canonical location, in the rendering command. The method includes inserting the command list into a queue. The method includes, responsive to the command list traversing the queue to an end position, retrieving the command list from the queue. The method includes updating the input state canonical location with updated input state data. The method includes retrieving the updated input state data from the input state canonical location using the input state reference. The method includes executing the rendering command based upon the updated input state data to render content.

According to an aspect of the instant disclosure, a means for operating a graphics processing unit (GPU) is provided. An input process within a GPU is invoked to process sensor input data to generate a result retained within GPU accessible memory, by the means for operating a GPU. The sensor input data is received from a sensor by the GPU. An output process within the GPU is invoked to utilize the result for display rendering, by the means for operating a GPU.

According to an aspect of the instant disclosure, a means for content rendering is provided. A command list comprising a rendering command is generated, by the means for content rendering. An input state reference, to an input state canonical location, is included in the rendering command, by the means for content rendering. The command list is inserted into a queue, by the means for content rendering. Responsive to the command list traversing the queue to an end position, the command list is retrieved from the queue, by the means for content rendering. The input state canonical location is updated with updated input state data, by the means for content rendering. The updated input state data is retrieved from the input state canonical location using the input state reference, by the means for content rendering.

The rendering command is executed based upon the updated input state data to render content, by the means for content rendering.

Figure 9:
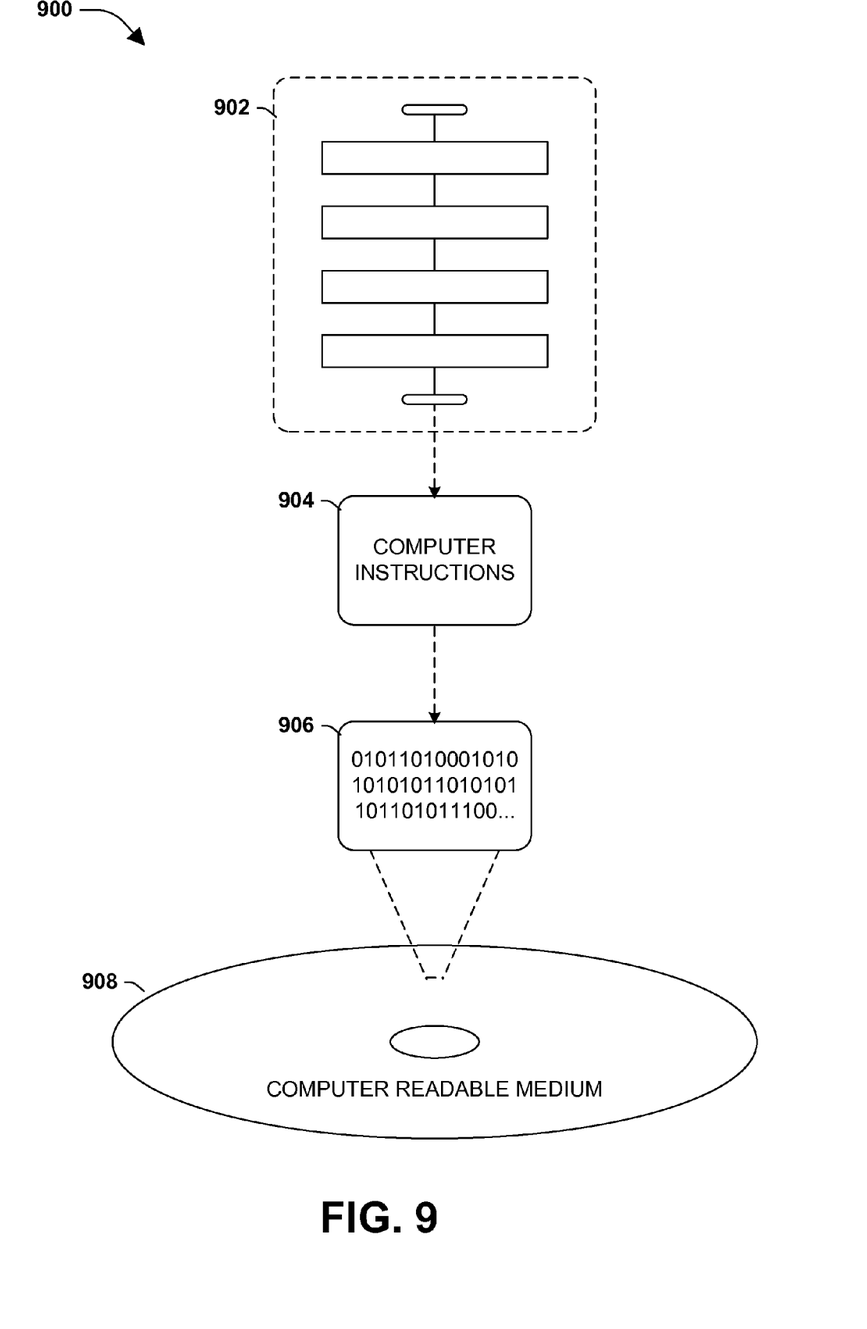
FIG. 9 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 9, wherein the implementation 900 comprises a computer-readable medium 908, such as a CD-R, DVD-R, flash drive, a platter of a hard disk drive, etc., on which is encoded computer-readable data 906. This computer-readable data 906, such as binary data comprising at least one of a zero or a one, in turn comprises a set of computer instructions 904 configured to operate according to one or more of the principles set forth herein. In some embodiments, the processor-executable computer instructions 904 are configured to perform a method 902, such as at least some of the exemplary method 100 of FIG. 1 and/or at least some of the exemplary method 700 of FIG. 7, for example. In some embodiments, the processor-executable instructions 904 are configured to implement a system, such as at least some of the exemplary system 300 of FIG. 3, at least some of the exemplary system 400 of FIG. 4, at least some of the exemplary system 500 of FIG. 5, at least some of the exemplary system 600 of FIG. 6, and/or at least some of the exemplary system 800 of FIG. 8, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 10:
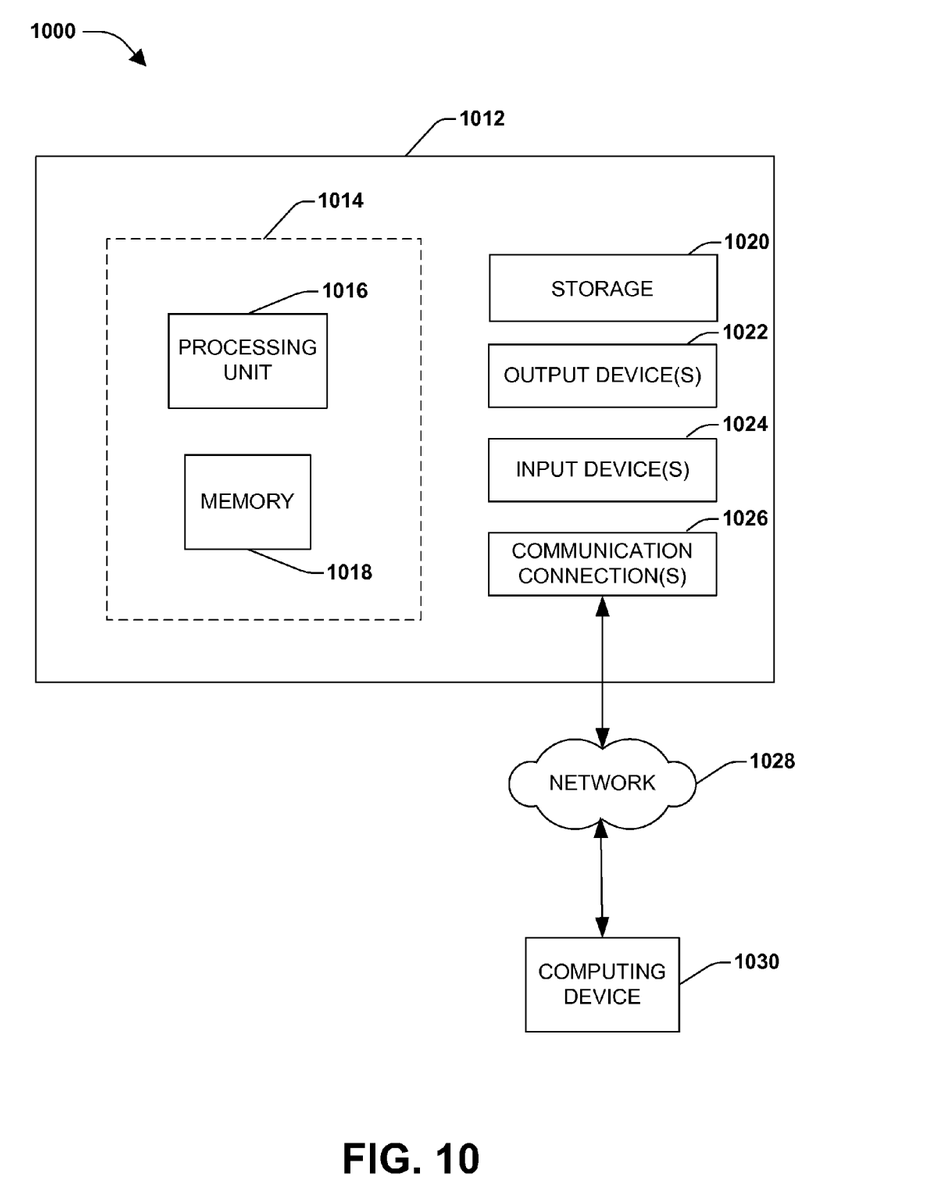
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for operating a graphics processing unit (GPU), comprising:
    generating, using the GPU, a result retained within GPU-accessible memory based at least in part on receiving sensor input data from a sensor, the generating occurring without providing the sensor input data from the GPU to a central processing unit (CPU);
    rendering, using the GPU, a display based at least in part on accessing the result from the GPU-accessible memory; and
    providing, using the GPU, a canonical memory location within the GPU-accessible memory storing the result to an application or an operating system component executing on the CPU after rendering the display.

2. The method of claim 1,
    wherein the GPU does not access the CPU during the generating the result.

3. The method of claim 1,
    wherein the sensor input data comprises touch sensor input data; and
    wherein the sensor is a touch sensor.

4. The method of claim 1, further comprising generating, using the GPU, the result with a touch-sensor processing GPU code component.

5. The method of claim 1, further comprising rendering, using the GPU, the display with a graphics rendering GPU code component.

6. The method of claim 1, wherein the result is not provided by the CPU to the GPU.

7. The method of claim 1, wherein the sensor input data corresponds to at least one of touch input, camera input, infrared input, audio input, video input, stylus input, or depth input.

8. The method of claim 1, wherein the result corresponds to a gesture derived from the input sensor data.

9. The method of claim 8, further comprising:
invoking an output process to render a user interface on the display based upon the gesture.

10. The method of claim 1, further comprising:
storing the result within the canonical memory location of the GPU-accessible memory.

11. The method of claim 10, further comprising:
providing the canonical memory location asynchronously to rendering the display.

12. The method of claim 1, further comprising:
providing an input process with read/write access to the sensor input data; and
providing an output process with at least read access to at least one of the sensor input data or the result.

13. The method of claim 1, comprising:
scheduling, by an operating system scheduler, the generating the result or rendering the display for execution using the GPU.

14. A system for operating a graphics processing unit (GPU), comprising:
a GPU scheduler configured to:
generate a result retained within GPU-accessible memory based at least in part on receiving sensor input data from a sensor, the generating occurring without providing the sensor input data from the GPU to a central processing unit (CPU);
render a display based at least in part on accessing the result from the GPU-accessible memory; and
provide a canonical memory location within the GPU-accessible memory storing the result to an application or an operating system component executing on the CPU after rendering the display.

15. The system of claim 14, wherein the scheduler is further configured to:
use the result before providing the result to the CPU.

16. The system of claim 14, further comprising:
a data access interface configured to:
provide the canonical memory location to the CPU asynchronous to rendering the display.

\* \* \* \* \*